March 24, 1959  J. R. BURTT  2,878,837
PNEUMATIC JACKET FOR AIRCRAFT COMBUSTION APPARATUS
Filed Dec. 3, 1956

INVENTOR.
Jack R. Burtt
BY
Ahlberg, Wypper & Gradolph
Attys.

[United States Patent Office — 2,878,837 — Patented Mar. 24, 1959]

2,878,837

PNEUMATIC JACKET FOR AIRCRAFT COMBUSTION APPARATUS

Jack R. Burtt, Indianapolis, Ind., assignor to Stewart-Warner Corporation, Chicago, Ill., a corporation of Virginia Application December 3, 1956, Serial No. 625,849

5 Claims. (Cl. 138—63)

The present invention relates to an improved jacket or housing especially suited for encasing lightweight combustion apparatus such as that used in aircraft for space heating purposes or to provide burned combustion gases for purging aircraft spaces subject to contamination by fuel vapor. Combustion apparatus of this character is disclosed in my copending application Serial No. 625,848, filed December 3, 1956, filed concurrently herewith on "Safety Combuston Apparatus for Aircraft."

One object of the invention is to provide, for encasing combustion apparatus of the above character, an exceptionally sturdy pneumatic jacket having an improved sheet metal construction which provides for rapid internal pressure equalization throughout a thin cylindrical plenum chamber of substantial length defined in the jacket while at the same time affording from very lightweight sheet metal extraordinary radial and axial strength capacity to contain pressure within the plenum chamber and to resist the deteriorating forces attendant to the extreme temperature conditions to which the jacket is subjected.

Another object is to provide an improved pneumatic jacket of the character recited in the previous object which is well suited inherently for economical fabrication from a minimum number of sheet metal parts.

Other objects and advantages will become apparent from the following description of the exemplary form of the invention illustrated in the drawings, in which.

Figure 1:
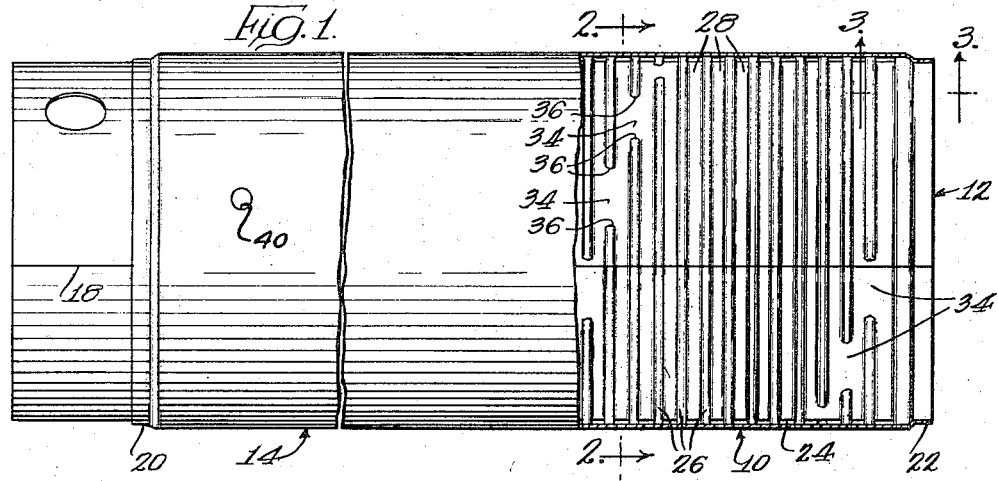
Figure 1 is a longitudinal side view, partially broken away for clearness in illustration, of a pneumatic jacket embodying the invention.

The pneumatic jacket 10 exemplifying the invention as illustrated in the drawings is specifically adapted to provide a safety closure for lightweight, highly stressed, fuel burning apparatus of the type used in aircraft for the purposes previously mentioned. The general structural relationship of the jacket 10 to coacting components of such combustion apparatus is disclosed in my previously mentioned patent application on "Safety Combustion Apparatus for Aircraft," filed concurrently herewith. That application describes the manner in which a pneumatic jacket is utilized to provide assurance against the escape of fire through the jacket from high temperature zones encircled by the jacket.

Devised to withstand the very high temperatures characteristic of the highly stressed operation of aircraft combustion apparatus, the jacket 10 comprises a thin metal liner or shell 12 of generally cylindrical shape overall, which fits closely within an outer cylindrical envelope 14 also formed of sheet metal. Preferably the inner shell 12 and the outer envelope 14 are both made of stainless steel.

As shown in Fig. 1, the outer envelope 14 extends concentrically along the inner shell 12 from one end of the shell nearly to the other end of the shell.

Figure 2:
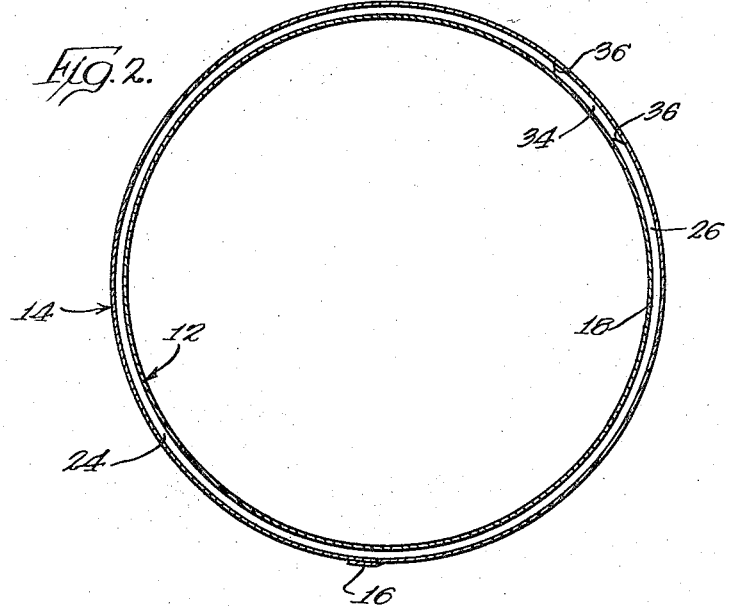
Fig. 2 is a transverse sectional view of the jacket taken along the line 2—2 of Fig. 1.

The outer envelope 14 is fabricated from a rectangular blank of sheet metal (also denoted by the numeral 14) curved transversely into a cylindrical shape, as shown in Fig. 2. The two longitudinal edges of the blank are slightly overlapped and firmly fixed together by brazing, welding or the like to form a sealed longitudinal joint 16.

Similarly, the inner shell 12 is formed from a single rectangular blank of sheet metal (denoted by the same reference numeral 12) curved transversely into the form of a circular cylinder. The two longitudinal edges of the blank are butt-welded together, Fig. 2, to form a sealed longitudinal joint 18, Figs. 1 and 2.

Figure 3:
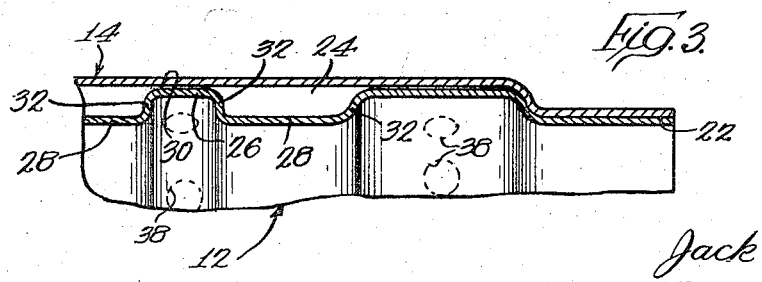
Fig. 3 is an enlarged fragmentary sectional view taken along the line 3—3 of Fig. 1, the clearance between closely spaced contiguous elements being somewhat exaggerated for clearness.

The circumferential marginal edges of the outer envelope 14 at opposite ends of the envelope are rolled or otherwise displaced radially inward, as indicated in Figs. 1 and 3, and sealed by brazing, welding or the like to the adjacent surface of the shell 12 to form two longitudinally spaced circumferential joints 20, 22.

Between its two circumferential joints 20, 22, the inner shell 12 has a medial outer diameter slightly less than the inner diameter of the envelope 14 thus defining between the shell and the envelope a thin cylindrical plenum chamber 24, Figs. 2 and 3, completely encircling the inner shell and extending longitudinally between the two joints 20, 22.

In use the jacket 10 is charged with air under considerable pressure supplied to the plenum chamber 24 through a small opening 40 in the outer envelope 14. The opening 40 is connected with suitable pneumatic charging structure such as that disclosed in my previously mentioned application on "Safety Combustion Apparatus for Aircraft."

The outward force of the plenum chamber pressure on the envelope 14 is easily contained by the high tensile strength of the envelope even though the envelope is fabricated from very thin material.

However, the inner shell 12 is subjected not only to the powerful collapsing force of pneumatic pressure within the plenum chamber 24 but also to stresses and deteriorating forces incident to the high temperatures generated in the operation of highly stressed aircraft combustion apparatus.

The strength capacity of the light sheet metal structure of the shell 12 to withstand these forces is sharply increased by an improved shaping of the shell structure in relation to the envelope 14 which affords the additional strength desired while at the same time providing for rapid internal pressure equalization throughout the radial thin plenum chamber 24.

For this purpose successive circumferential segments of the inner shell 12 constituting successive axial increments of its length, between the joints 20, 22, are deformed radially in relation to each other to define a series of hollow, circumferential lands 26 separated from each other longitudinally along the shell by a series of circumferential depressions 28 formed in the shell between the successive lands. Each land 26 is very narrow transversely (as viewed in Fig. 3) in relation to the length and diameter of the portion of the inner shell 12 encompassed by the outer envelope 14.

For example, the lands formed on an inner shell having a diameter of approximately eleven inches and a length of approximately thirty-three inches between the joints 20, 22 can properly have a width of approximately one-quarter of an inch except for the two lands nearest the respective joints 20, 22, which are slightly wider. In this instance each land 26 can have a radial displacement of approximately one-eighth of an inch from the adjacent depressions 28.

Each land 26 defines an outer surface 30, Fig. 3, of cylindrical shape disposed in very close proximity to the adjacent inner surface of the envelope 14. To facilitate illustration, the very narrow clearance between the land surfaces 30 and the adjacent inner surface of the envelope 14 (which clearance for the above example may be of the order of one thirty-second of an inch) is somewhat exaggerated in Fig. 3.

The hollow lands 26 are formed by deforming corresponding portions of the inner shell structure radially outward in relation to the adjacent depression 28. This deformation of the inner shell structure is designed to produce between the two arcuate edges of each land 26 and the adjacent depressions 28, two connecting shoulders 32, Fig. 3, extending radially between the land and the depressions at sharp angles to the axis of the shell. The effect is to sharply increase the effective strength of the shell 12.

As shown in Figs. 1 and 2, each land 26 encircles the inner shell 12 except for a short arcuate discontinuity 34 between two circumferential ends or extremities 36 of the land separated by an acute radial angle. The short arcuate portion of the structure of the shell 12 corresponding to the discontinuity 34 between the adjacent ends 36 of each land 26 is displaced radially inward from the outer cylindrical surface 30 of the land to have a radial spacing from the axis of the shell similar to that of the previously mentioned depressions 28.

Thus spaced radially inward from the adjacent inner surface of the outer envelope 14, the discontinuity 34 in each land 26 provides a connecting passage facilitating a free flow of air through the passage to quickly equalize the plenum chamber pressure on opposite sides of the land. This pressure equalizing flow of air is produced automatically through the discontinuities 34 in the respective lands 26 to rapidly reflect throughout the plenum chamber 24 a change in pressure in any portion of the chamber. Thus the addition of air to the plenum chamber 24 through the opening 40 or the escape of air through a break in any portion of the metal structure defining the chamber is manifested immediately by a change in pressure throughout the chamber.

An optimum distribution over the inner shell 12 of the strength capacity of the shell is provided by a circumferential displacement of each successive land 26 in relation to the immediately adjacent lands so that the discontinuity 34 of each land is displaced circumferentially from the discontinuities of the adjacent lands by a radial angle approximately equal to the radial angle of the discontinuity itself. For the above example in which dimensional relationships are recited, the discontinuity for a typical land can properly have a radial angle of approximately twenty degrees. In the same structure the angle of circumferential displacement between the discontinuities of successive lands can properly be approximately thirty degrees.

The direction of circumferential displacement of each land 26 in relation to its immediately adjacent lands is the same for every land of the series formed in the inner shell. Hence the discontinuities 34 of the successive lands 26 lie in a generally helical pattern extending between the two previously mentioned joints 20, 22.

Thus oriented, the discontinuities 34 together with the connecting portions of the adjacent depressions 28 form an axial stabilizer reinforced by the lands 26 and shoulders 32 and extending longitudinally for the length of the plenum chamber 24 to provide assurance against longitudinal distortion of the shell 12.

In some instances it may be desirable to further increase the exceptional strength capacity of the lightweight inner shell 12 to resist collapse by air pressure within the plenum chamber 24. This can be accomplished very simply by spot welding the lands 26 of the inner shell to the outer envelope 14 at closely spaced circumferential intervals (approximately one inch) around the latter. Such spot welds are indicated in Fig. 3 and designated by the numeral 38.

Thus formed from only two sheet metal components, the improved pneumatic jacket 10 is well suited for economical fabrication even from stainless steel.

While I have shown and described a preferred embodiment of my invention, it will be apparent that numerous variations and modifications thereof may be made without departing from the underlying principles and scope of the invention. I therefore desire, by the following claims, to include all such variations and modifications by which substantially the results of my invention may be obtained through the use of substantially the same or equivalent means.

I claim:

1. A lightweight metal jacket comprising, in combination, a metal outer envelope of cylindrical shape, a metal shell of cylindrical shape disposed concentrically within said envelope, said envelope and said shell being circumferentially joined together at two locations axially spaced therealong to define a thin cylindrical plenum chamber, said inner shell between said locations being deformed into a series of circumferential lands axially spaced from each other by a series of intervening circumferential depressions radially spaced inwardly from the adjacent lands and joined thereto by connecting shoulders formed in the shell to extend radially inward at a steep angle to the axis of the shell from the circumferential edges of the respective lands to the adjacent circumferential edges of adjoining depressions, said lands extending radially outward into close proximity to said envelope, each of said lands encircling the major portion of the shell and terminating circumferentially at two circumferential ends separated by a circumferential discontinuity of the land spaced a substantial radial distance from said envelope, and the successive lands of said series being displaced circumferentially from the immediately adjacent lands to locate the discontinuities of the successive lands in a generally helical path extending across said series of lands.

2. A lightweight pneumatic jacket comprising, in combination, a metal outer envelope of cylindrical shape, a metal shell of cylindrical shape disposed within said envelope, said envelope and said shell being circumferentially joined together at two locations axially spaced therealong to define a thin cylindrical plenum chamber, said inner shell between said locations being deformed into a series of circumferential lands axially spaced from each other by a series of intervening circumferential depressions radially spaced inwardly from the adjacent lands and joined thereto by integral connecting shoulders formed in the shell, said lands extending radially outward into fixed contact to said envelope, and each of said lands encircling a substantial portion of the shell and terminating circumferentially at two circumferential ends separated by a circumferential discontinuity of the land spaced a substantial radial distance from said envelope.

3. A pneumatic jacket comprising, in combination, a generally cylindrical shell of thin metal, said shell between opposite ends thereof being deformed to define a series of hollow circumferential lands projecting radially outward to define outer arcuate surfaces of cylindrical shape having substantial width along the axis of the shell, each land being integrally joined along the two arcuate edges thereof with an adjacent pair of an axially spaced series of circumferential depressions formed in the shell in alternate spaced relation with the successive lands, each of said lands having a substantial circumferential extent around said shell to two circumferential ends spaced apart by an acute radial angle and connected by an arcuate discontinuity in the land spaced radially inward from the outer arcuate surface thereof, the discontinuities of successive lands being spaced circumferentially from each other, a thin metal envelope of cylindrical shape encircling said shell and extending axially therealong in radial proximity to said outer land surfaces, and said shell and said envelope being circumferentially sealed together at two axially spaced locations therealong disposed at opposite ends of said series of lands thereby defining between said shell and said envelope a plenum chamber adapted to contain gas under pressure.

4. A lightweight pneumatic jacket comprising, in combination, a metal outer envelope of cylindrical shape, a metal shell of cylindrical shape disposed within said envelope, said envelope and said shell being circumferentially joined together at two locations axially spaced therealong to define a thin cylindrical plenum chamber, said inner shell between said locations being deformed into a series of circumferential lands axially spaced from each other by a series of intervening circumferential depressions radially spaced inwardly from the adjacent lands and joined thereto by integral connecting shoulders formed in the shell, said lands extending radially outward into proximity to said envelope, individual lands of said series thereof being welded to the adjacent envelope, and each of said lands encircling a substantial portion of the shell and terminating circumferentially at two circumferential ends separated by a circumferential discontinuity of the land spaced a substantial distance radially inward from said envelope.

5. A lightweight pneumatic jacket comprising, in combination, a metal outer envelope of cylindrical shape, a metal shell of cylindrical shape disposed within said envelope, said envelope and said shell being being circumferentially joined together at two locations axially spaced therealong to define a thin cylindrical plenum chamber, said inner shell between said locations being deformed into a series of circumferential lands axially spaced from each other by a series of intervening circumferential depressions radially spaced inwardly from the adjacent lands and joined thereto by integral connecting shoulders formed in the shell, said lands extending radially outward into fixed contact to said envelope, and each of said lands encircling a substantial portion of the shell and terminating circumferentially at two circumferential ends separated by a circumferential discontinuity of the land spaced a substantial radial distance from said envelope and with the circumferential discontinuities of adjacent lands being offset relative one another.

References Cited in the file of this patent
UNITED STATES PATENTS

| | | |
|---|---|---|
| 403,644 | Brown | May 21, 1889 |
| 1,783,597 | Babe | Dec. 2, 1930 |
| 2,634,759 | Twickler | Apr. 14, 1953 |
| 2,695,038 | Parce et al. | Nov. 23, 1954 |